United States Patent Office.

ADOLPH BRASE, OF SCIOTOVILLE, ASSIGNOR OF ONE-HALF TO WILLIAM Q. ADAMS, OF PORTSMOUTH, OHIO.

FIRE-BRICK.

SPECIFICATION forming part of Letters Patent No. 265,654, dated October 10, 1882.

Application filed July 6, 1882. (No specimens.)

*To all whom it may concern:*

Be it known that I, ADOLPH BRASE, of Sciotoville, in the county of Scioto and State of Ohio, have invented certain new and useful Improvements in Fire-Bricks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in fire-bricks, and in processes of manufacturing the same, the object being to produce fire-brick not susceptible, in virtue of their composition, to disturbing expansions and contractions during the process of burning, and of superior resistance both to high degrees of heat and to all influences tending to fracture or abrade them.

With these objects in view my invention consists in fire-brick formed from clay raised to a white heat and suddenly cooled by water previous to being molded and burned.

My invention further consists in a process of making fire-brick, consisting in raising raw clay to a white heat and suddenly cooling it by water, and in molding and burning brick formed from clay so treated.

The ends of my invention can be attained by conducting the process in several different ways. One method consists in raising the raw clay to a white heat in closed ovens, and in precipitating the clay when so heated into water, whereby the clay is crystallized and rendered porous and deprived of all foreign substances associated with it. This clay, after being heated as above, is formed into bricks and burned in the ordinary manner, and, inasmuch as the clay has been previously tempered, the bricks undergo very little, if any, structural change during the operation of burning them. The tempering treatment to which the clay is subjected also insures homogeneity in the bricks, as all foreign substances, certainly all those of organic nature, are reduced and removed before the bricks are molded.

Fire-bricks constructed in accordance with my invention are not only capable of resisting nearly twice the degree of heat which ordinary fire-brick can withstand, but they are also less liable to be fractured or abraded in handling than the same.

The operation of tempering the raw clay may be conducted in many ways, any convenient method of suddenly subjecting highly-heated clay to the action of water sufficing.

Having fully described my invention, what I claim as new, and desire to secure by Letters Patent, is—

1. Fire-brick formed of clay raised to incandescence and suddenly cooled previous to being molded and burned, substantially as set forth.

2. A process of making fire-brick, consisting in raising raw clay to incandescence and suddenly cooling it by water, and in molding and burning brick formed from clay so treated, substantially as set forth.

In testimony that I claim the foregoing I have hereunto set my hand this 19th day of June, 1882.

ADOLPH BRASE.

Witnesses:
DANIEL WESTWOOD,
LEWIS GATES.